April 22, 1941.   B. A. WATSON   2,239,208
TRACTOR SEAT SUPPORT
Filed April 10, 1940   2 Sheets-Sheet 1
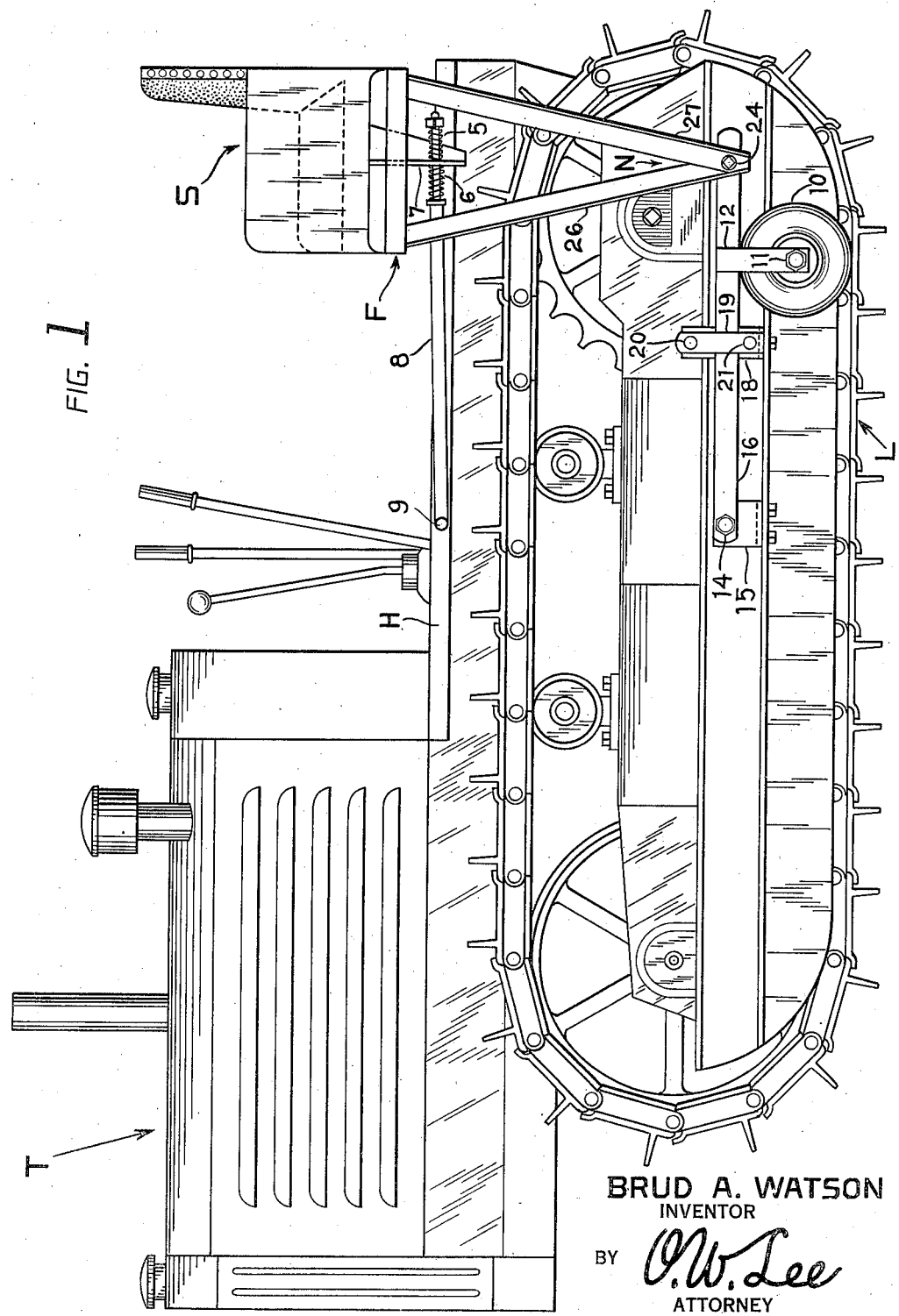
BRUD A. WATSON
INVENTOR
BY O. W. Lee
ATTORNEY April 22, 1941.  B. A. WATSON  2,239,208
TRACTOR SEAT SUPPORT
Filed April 10, 1940  2 Sheets-Sheet 2
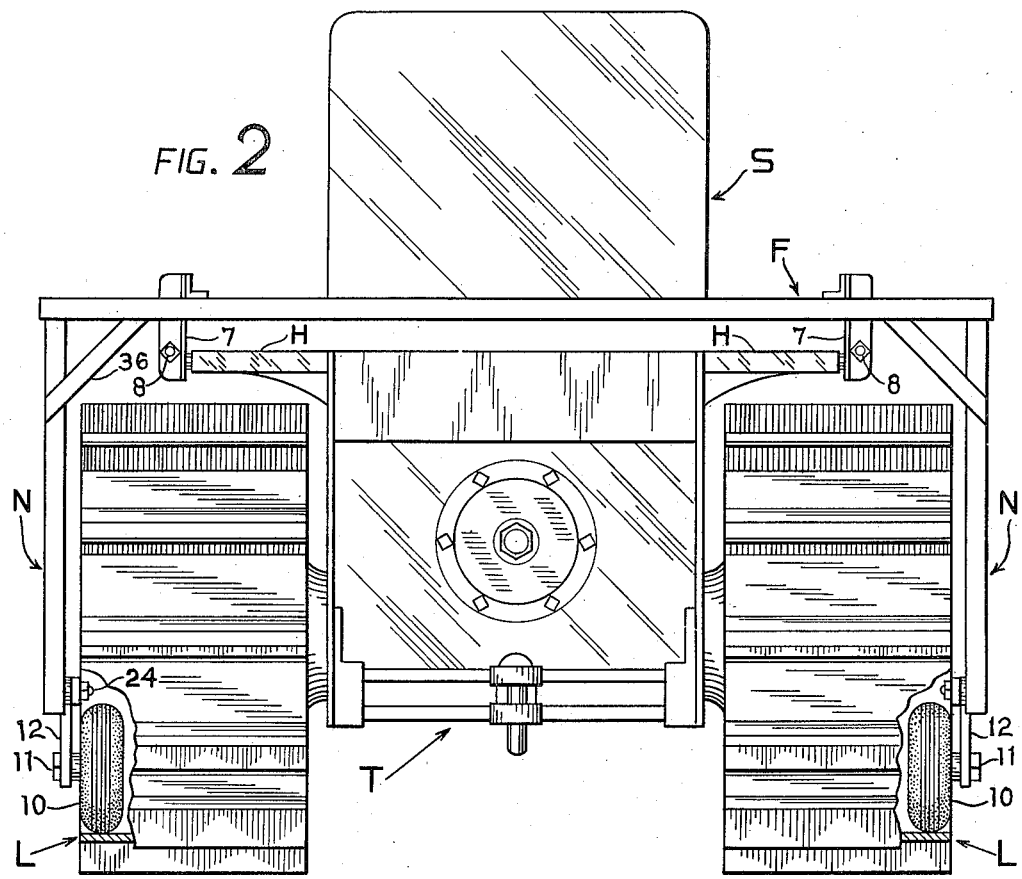
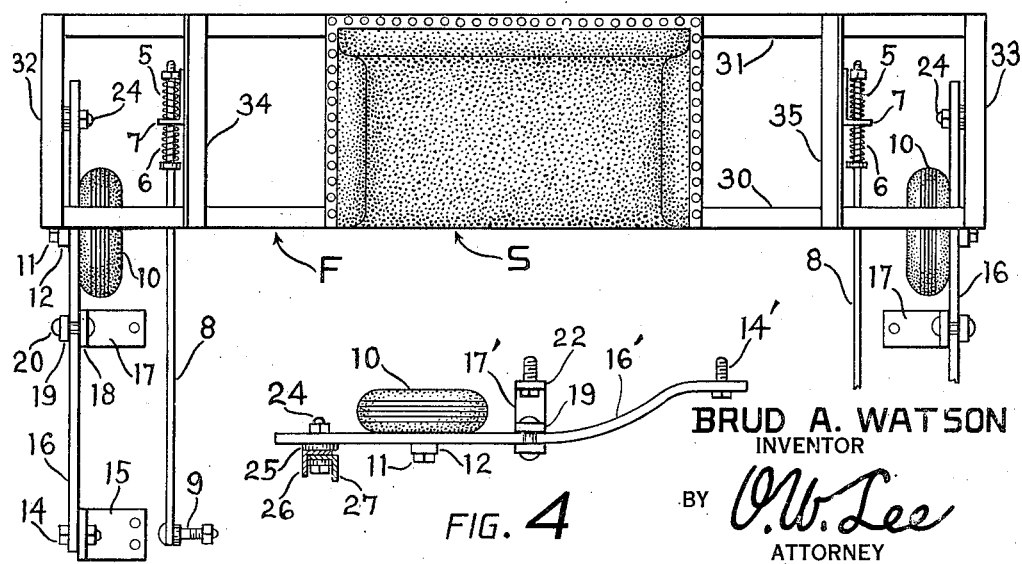
BRUD A. WATSON
INVENTOR
BY O.W. Lee
ATTORNEY Patented Apr. 22, 1941

2,239,208

UNITED STATES PATENT OFFICE 2,239,208

TRACTOR SEAT SUPPORT

Brud A. Watson, Harrington, Wash.

Application April 10, 1940, Serial No. 328,854

10 Claims. (Cl. 180—9.1)

The present invention relates to a tractor seat support for track laying tractors, and embodies a wheeled sulky which travels on the laid portion of the track of the tractor, and this wheeled sulky supports a seat for the tractor driver so that the driver will be free from the vibrations of the tractor engine.

It is well known that the engine of a track laying tractor produces considerable vibration which is imparted throughout the framework of the tractor. The conventional practice of mounting the driver's seat upon the framework of the tractor subjects the driver to the vibrations of the engine. These vibrations agitate the internal organs of the driver and are detrimental to the normal body functions. Some drivers are seriously affected by these vibrations, even to the extent of requiring hospitalization. A daily detrimental effect arises from the fact that a tractor driver usually eats a hearty noonday meal and then resumes his work with a full stomach, with the objectionable result that the vibrations of the tractor engine constantly agitate the food mass in antagonism to the normal persistaltic action of the stomach. The driver then experiences discomfort from the weight of food and the bearing down effect of the vibrations, until the digestive process is completed, which usually requires a longer period than normal, due to the disturbing vibrations. Other organs such as the intestines, liver, kidneys and heart are also objectionably affected by the vigorous vibrations to which the tractor driver is subjected when the seat is mounted on the tractor frame.

To overcome these difficulties, I take advantage of the well known fact that in a track laying tractor the laid portion of the track is stationary and as solid as the ground itself and therefore entirely free from vibration. Upon the upper surface of the laid portion of each of the paired tracks I mount a wheel, and each wheel of the pair is hitched to the body of the tractor by a draft arm and hinge bolt so that the wheels are free to rise and fall. A seat supporting structure is mounted upon this pair of wheels and straddles the tractor so as to provide a seat frame spaced slightly above the tractor. This seat frame is provided with paired coupling bars, each of which is connected to the body of the tractor by a hinge bolt, and each coupling bar is slidably engaged with the seat frame and provided with opposed compression springs which form a yieldable connection between the tractor and the seat frame upon which the usual seat is mounted after being removed from the tractor frame.

In this manner, the tractor driver rides on the described sulky wheels which travel along on the stationary portion of the tractor track, and therefore the driver is not subjected to the vibration of the tractor engine.

The accompanying drawings illustrate the invention in the form in which it has been reduced to practice and commercially marketed.

Fig. 1 shows a side elevation of a tractor with my invention mounted thereon.

Fig. 2 is a rear elevation of Fig. 1 with portions of the tractor track broken away to disclose the sulky wheels.

Fig. 3 is a plan view of the invention separate from the tractor.

Fig. 4 is a plan view of a wheel mount.

The invention is applicable to various forms of track laying tractors, and I have shown by way of example, a tractor T and have indicated the laid portion of each track at L. The paired wheels 10 are each mounted to run on the laid portion of the respective tracks L—L, and it is desirable to use pneumatic wheels. The spindle of each wheel 10 is secured to an upright standard 12 as is indicated at 11, and each standard 12 is rigid with a draft arm such as 16 which is hinged to the body of the tractor as indicated at 14, a bracket 15 being employed if necessary for convenience of attachment, or else the arm may be curved as indicated at 16' in Fig. 4 and the hinge bolt 14' employed for direct attachment to the tractor, without the necessity of the aforesaid bracket 15. These wheels 10 are each maintained in a fixed path by guide brackets such as 17 which are bolted to the tractor body in any suitable manner. Each guide bracket has an inner upright guide bar 18 and an outer upright guide bar 19 spaced apart to accommodate the draft arm 16, and these guide bars are provided with bolts or rivets such as 20 and 21 which act as stops for the vertical movements of the draft arm 16, the lower stop 21 sufficing to support the entire structure in emergencies, as for instance when there is a loss of air pressure in the pneumatic tire 10.

The usual seat S is removed from the tractor and mounted on a frame such as F, here shown as consisting of a front rail 30, rear rail 31, end rails 32 and 33 and cross rails 34 and 35 rigidly secured together in any practical manner, electrical welding being preferable. Paired legs N—N each comprising upright bars such as 26 and 27 are rigidly secured to the seat frame F and braced by suitable struts such as 36, one of such legs being placed at each end of the seat frame F which is made of sufficient length to span the tractor and its paired tracks. The lower ends of the bars 26 and 27 are brought together and connected to the draft arm 16 by a hinge bolt as indicated at 24, thus hingedly supporting the seat frame F upon the paired wheels 10. If desired, a wear plate such as shown at 25 in Fig. 4, may be positioned on the outer side of the draft arm 16 or else attached thereto to provide increased thickness for the bolt connection at 24.

The seat frame F is poised above the paired hinge connections 24 by paired coupling bars 8—8 which are hinged to the tractor body as indicated at 9 and are slidably engaged through the depending brackets 7—7 and spring urged in opposite directions by the opposed compression springs 5 and 6 placed on opposite sides of each bracket 7 and retained under compression in any suitable manner. In the present instance I have shown these coupling bars 8—8 as hinged to the fenders H and H which are conventional on most track laying tractors, and whenever there are no fenders, then these coupling bars may be connected to the tractor body in whatever location circumstances may suggest and necessity require. In any such instances the brackets 7 are spaced apart the required amount to suitably position the coupling bars 8—8 for convenient attachment. As here shown these brackets 7 are secured to the cross bars 34 and 35 respectfully, but it would be equally as feasible to connect them to either the front rail 30 or else to the rear rail 31. It will also be readily understood that these paired coupling bars may be supplanted by a single coupling bar centrally located and spring urged to provide the required yieldable connection between the seat frame and the tractor.

From this description it will be seen that the tractor seat S is mounted upon the seat frame F which is supported upon the paired wheels 10—10 which travel upon the laid portions L—L of the respective tracks of the tractor, and that the hinge connections at 14, 24 and 9, together with the yieldable connections at 7—7 provide freedom of movement of the seat frame independent of the tractor frame, and that the vibrations of the tractor engine are not imparted to the seat frame which also derives additional advantage from the yieldability of the pneumatic tires 10—10. Thus the tractor driver is free from the vibrations of the tractor engine and also free from the jars to which he would otherwise be subjected when the tractor travels over rough ground, as is often the case in the usual operation of track laying tractors.

The device is usually supplied without the seat and it is a simple matter to remove the conventional seat from the tractor and mount the described sulky seat support in the proper manner and then secure the original seat upon the sulky. Some tractors have channel iron side beams with outwardly directed flanges as indicated in Fig. 1 and in such instances it is a simple matter to bolt the brackets 15 to these flanges. Usually there are a number of bolts along the lower flange of such side beams and it is conveniently practical to bore these brackets so as to accept the bolts at a selected position and thus eliminate the necessity of providing additional holes for attachment of the brackets 15. The guide brackets 17 may be attached in the same manner.

Some tractors have the flanges of the side rails directed inwardly and in such instances, it is a simple matter to provide each bracket 17 with an upturned inner end as indicated at 22 in Fig. 4 and then bolt this upturned end 22 flat against the tractor. The brackets 15 can also be provided with a similar upturned end mounted flat against the tractor, or if desired, the draft arm may be curved as indicated at 16' in Fig. 4 so as to bring its forward end in alignment with the upturned end 22 of the bracket 17' thus eliminating the necessity for the brackets 15.

Since the brackets 17 are slidable on the draft arms 16, the former may be mounted either forwardly or rearwardly of the wheels 10, depending upon the convenience of attachment afforded by the tractor.

The wheels 10 have been referred to as pneumatic wheels for the reason that such small size pneumatic wheels are in general use for other purposes and are readily available on the open market at a conservative price and equipped with roller bearings ready for immediate assembly. Thus they are economical and also preferable; however, any suitable wheels may be substituted therefor.

In instances of extreme conditions, suitable stabilizers may also be employed to relieve the stress of lateral forces upon the seat frame, but as these are usually unnecessary they are not here shown.

From the showing in Fig. 1 it will be readily understood that the brackets 15 and 18 could be mounted on the underside of the illustrated flange of the side beam, so as to position the draft arm 16 at the spindle level of the wheel 10 for direct connection thereto without employing the standard 12, the legs of the seat frame being lengthened accordingly. It is also possible to shape these legs so that they can be connected direct to the spindles of the wheels 10, and it will be understood that the illustrated embodiment is intended as an example of convenient manufacture and not as an invariable structure.

In the present disclosure I claim as my invention:

1. In a track laying tractor including a main body frame traveling on paired endless tracks, a wheeled seat frame separate from said main frame, the wheels of said seat frame being mounted to travel upon the laid portion of the tractor tracks and connected to the tractor so as to derive draft force therefrom.

2. In a track laying tractor having a main body frame traveling on paired tracks, a wheeled seat frame separate from said main frame, the wheels of said seat frame being mounted to travel upon the laid portions of the respective tracks of the tractor, said wheeled seat frame being connected to the tractor so as to derive draft force therefrom, and a seat mounted upon said wheeled seat frame.

3. In a track laying tractor having paired tracks, a seat frame spanning said tractor and tracks, a pair of legs rigidly secured to the opposite ends of said seat frame, a pair of wheels supporting said legs, each of said wheels mounted upon the laid portion of the respective tracks, draft connections between said wheels and said tractor, and a spring urged coupling connecting said seat frame with said tractor.

4. In a track laying tractor having paired tracks, a seat frame, a pair of legs rigidly secured to the opposite ends of said seat frame, a pair of wheels supporting said legs, each of said wheels mounted upon the laid portion of the respective tracks, draft connections between said wheels and said tractor, and a spring urged coupling connecting said seat frame with said tractor.

5. In a track laying tractor having paired tracks, a pair of wheels mounted upon the laid portions of the respective tracks, draft arms connecting said wheels with the tractor, a seat supporting structure carried by said wheels, and a spring urged coupling connecting said seat supporting structure to said tractor.

6. In a track laying tractor having paired tracks, a pair of wheels mounted upon the laid portions of the respective tracks, draft arms connecting said wheels with the tractor, a seat supporting structure carried by said wheels, a spring urged coupling connecting said seat supporting structure to said tractor, and paired guide members secured to opposite sides of said tractor and engaging the respective draft arms to hold said wheels against lateral movement.

7. A tractor seat support comprising a pair of wheels, draft bars on the outside of said wheels, inwardly extending brackets hinged to said draft bars for connecting the same to a tractor, uprights hinged to said draft bars, a seat frame secured to said uprights, and a spring urged coupling bar slidably engaged with said seat frame for yieldably connecting the same to a tractor.

8. A tractor seat support comprising a pair of wheels, a seat supporting structure carried by said wheels, a spring urged coupling bar slidably engaged with said seat supporting structure for yieldably connecting the same to a tractor, draft bars for connecting said wheels to a tractor, guide brackets for attachment to a tractor, said draft bars slidably engaged in said guide brackets and vertically movable therein.

9. A tractor seat support comprising a pair of wheels, draft bars for connecting said wheels to a tractor, a seat supporting frame, paired legs secured to the opposite ends of said frame, hinge bolts connecting the respective draft bars to said legs, a spring urged coupling bar slidably engaged with said frame for yieldably connecting the same to a tractor.

10. A tractor seat support comprising a pair of wheels, draft bars for connecting said wheels to a tractor, a seat supporting frame, paired legs secured to the opposite ends of said frame, hinge bolts connecting the respective draft bars to said legs, a spring urged coupling bar slidably engaged with said frame for yieldably connecting the same to a tractor, and a pair of guide brackets for attaching to opposite sides of a tractor, said draft bars slidably engaged in said guide brackets and vertically movable therein.

BRUD A. WATSON.